United States Patent
Howard (10) Patent No.: US 9,292,263 B2
(45) Date of Patent: Mar. 22, 2016

(54) SYSTEM AND METHOD FOR EMBEDDING SYMBOLS WITHIN A VISUAL REPRESENTATION OF A SOFTWARE DESIGN TO INDICATE COMPLETENESS

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 0 days.

(21) Appl. No.: 14/253,633

(22) Filed: Apr. 15, 2014

(65) Prior Publication Data

US 2014/0310689 A1    Oct. 16, 2014

Related U.S. Application Data

(60) Provisional application No. 61/812,154, filed on Apr. 15, 2013.

(51) Int. Cl.
 *G06F 9/44* (2006.01)
 *G06Q 10/06* (2012.01)

(52) U.S. Cl.
 CPC .. *G06F 8/33* (2013.01); *G06F 8/20* (2013.01); *G06F 8/34* (2013.01); *G06Q 10/06* (2013.01)

(58) Field of Classification Search
 None
 See application file for complete search history.

(56) References Cited

U.S. PATENT DOCUMENTS

| | | | |
|---|---|---|---|
| 7,076,312 B2* | 7/2006 | Law et al. | 700/23 |
| 7,117,449 B1* | 10/2006 | Levin et al. | 715/765 |
| 8,645,105 B1* | 2/2014 | Shepherd et al. | 703/1 |
| 2002/0170042 A1* | 11/2002 | Do et al. | 717/143 |
| 2003/0079188 A1 | 4/2003 | McConaghy et al. | |
| 2003/0149968 A1 | 8/2003 | Imai | |
| 2004/0015775 A1 | 1/2004 | Simske et al. | |
| 2004/0021666 A1* | 2/2004 | Soll et al. | 345/474 |
| 2004/0128001 A1* | 7/2004 | Levin et al. | 700/31 |
| 2004/0243970 A1* | 12/2004 | Ohmori et al. | 717/101 |
| 2006/0136850 A1 | 6/2006 | Corbeil, Jr. et al. | |
| 2006/0256665 A1* | 11/2006 | Kadokura | 368/107 |
| 2010/0017784 A1* | 1/2010 | O'Mahony et al. | 717/101 |
| 2010/0023355 A1* | 1/2010 | Sagalow et al. | 705/4 |
| 2012/0079449 A1* | 3/2012 | Sanderson | G06Q 10/103 717/102 |
| 2014/0053125 A1* | 2/2014 | DeLuca et al. | 717/101 |
| 2014/0172513 A1* | 6/2014 | MacLean et al. | 705/7.39 |

OTHER PUBLICATIONS

PCT Application PCT/US2013/044573 International Search Report and Written Opinion dated Jul. 22, 2013, 8 pages.
U.S. Appl. No. 14/312,639 Notice of Allowance dated Sep. 12, 2014, 11 pages.

\* cited by examiner

*Primary Examiner* — Isaac T Tecklu
(74) *Attorney, Agent, or Firm* — Lathrop & Gage LLP (57) ABSTRACT

A system and method for quickly discerning a process's completeness via graphical representation of processes by graphical objects with associated embedded symbols is disclosed. The present system and method decreases design time and increases personnel deployment efficiency.

18 Claims, 10 Drawing Sheets

SYSTEM AND METHOD FOR EMBEDDING SYMBOLS WITHIN A VISUAL REPRESENTATION OF A SOFTWARE DESIGN TO INDICATE COMPLETENESS

RELATED APPLICATIONS

This application claims priority to U.S. Patent Application Ser. No. 61/812,154, titled "System and Method for Embedding Symbols Within Software Development Space" filed Apr. 15, 2013, and incorporated herein by reference. This application is also related to and references co-owned U.S. patent application Ser. No. 13/490,345, titled "Method For Automatic Extraction of Designs From Standard Source Code," filed Jun. 6, 2012, and which is fully incorporated herein by reference.

BACKGROUND

Graphical representations of designs are dynamic for the placement of design objects but are typically static when it comes to describing the completeness of any particular design object.

SUMMARY OF THE INVENTION

Being able to quickly discern an object's completeness allows the developers to focus their attention where needed. This decreases design time and increases personnel deployment efficiency.

DETAILED DESCRIPTION

Definitions

The following definitions provide guidelines for interpretation of the terms below as used herein:

Function—a software routine, or more simply an algorithm that performs one or more data transformations.

Control Kernel—A control kernel, also known as a "control" and/or a "control transform," is a software routine or function that contains the following types of computer-language constructs: subroutine calls, looping statements (for, while, do, etc.), decision statements (if-then-else, etc.), and branching statements (goto, jump, continue, exit, etc.).

Process Kernel—A process kernel, also known as a "process" and a "process transform," is a software routine or function that does not contain the following types of computer-language constructs: subroutine calls, looping statements, decision statements, or branching statements. Information is passed to and from a process kernel via memory (e.g., RAM).

State Machine—A state machine, as used herein, is a two-dimensional network that links together all associated control kernels into a single non-language construct that activates process kernels in the correct order. The process kernels form the "states" of the state-machine and the activation of those states form the state transitions. This eliminates the need for software linker-loaders.

State Machine Interpreter—a State Machine Interpreter is a method whereby the states and state transitions of a state machine are used as active software, rather than as documentation.

Finite state machine—A finite state machine is an executable program constructed from the linear code blocks resulting from transformations, where the transformation-selection conditions are state transitions constructed from the control flow.

Terminator—A terminator is an event that occurs outside the scope of the current system or function.

Computing Environment

Figure 1:
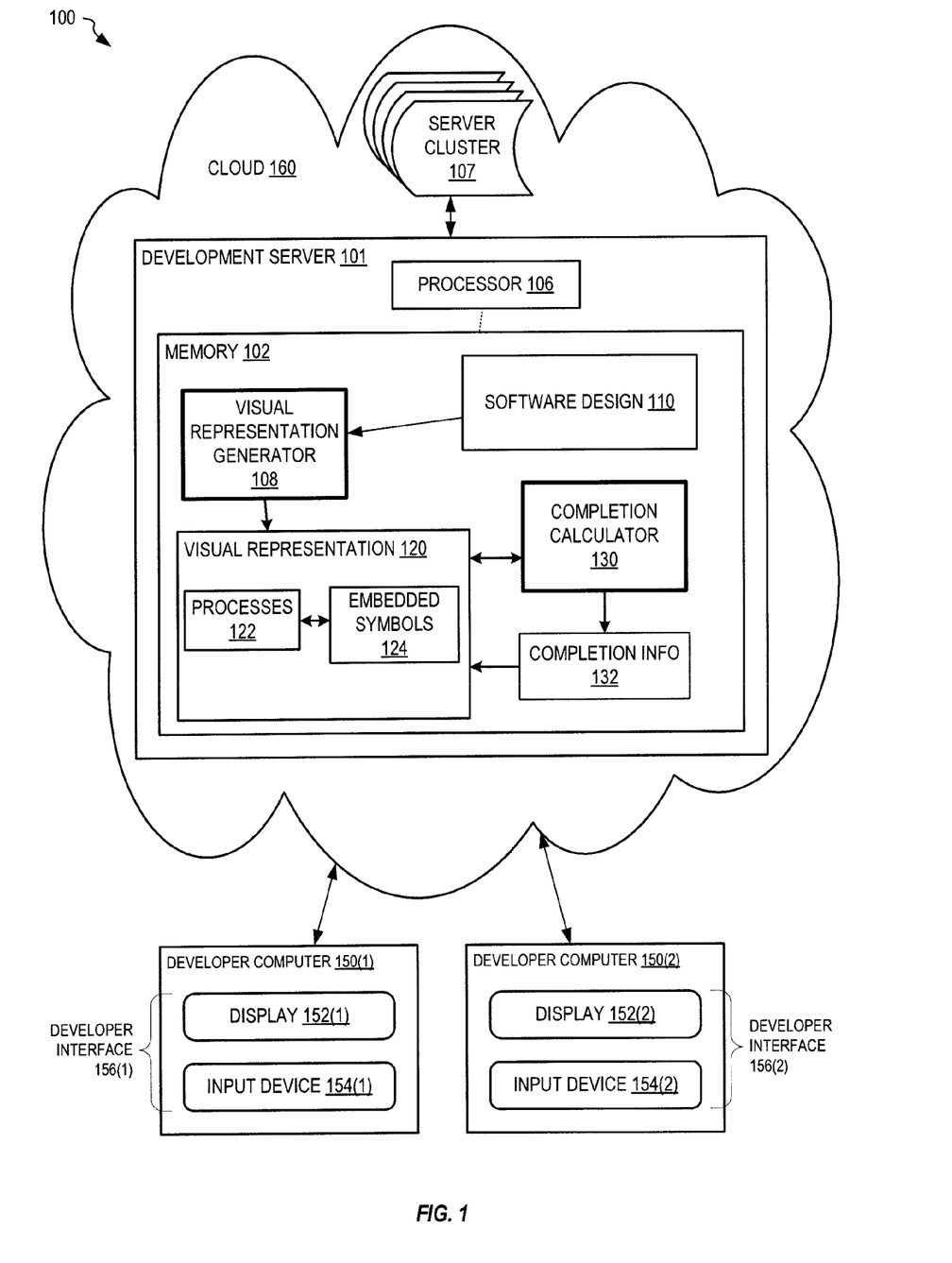
FIG. 1 depicts one exemplary system for generating and monitoring embedded symbols, in one embodiment

FIG. 1 depicts one exemplary system 100 for embedding symbols 124 within a visual representation 120 of a software design 110 to indicate completeness. System 100 includes a development server 101 that is located, for example, within cloud 160. Cloud 160 utilizes a computer communication network that may include the Internet and other computer networking technologies.

Figure 2:
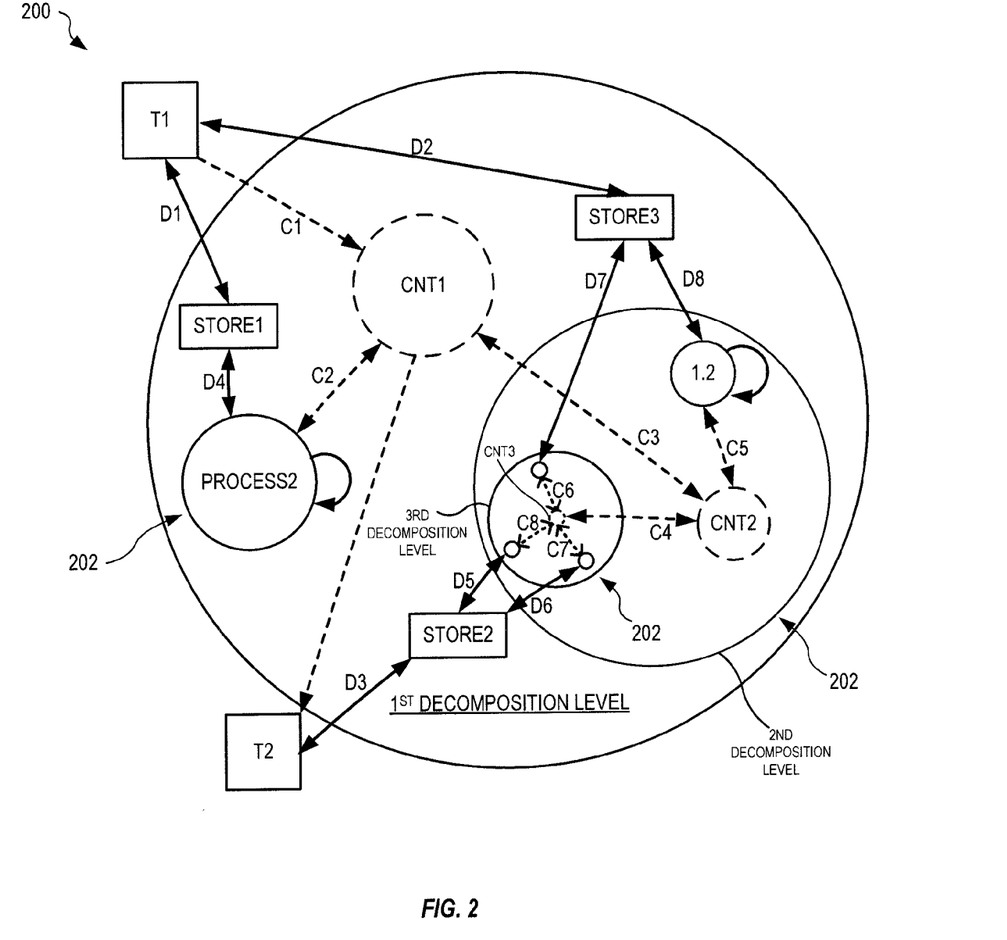
FIG. 2 shows one exemplary hierarchical decomposition graph that represents a software design processable by the system of FIG. 1.

Development server 101 includes a processor 106 and a memory 102. Memory 102 stores software design 110 and a visual representation generator 108 that has machine readable instructions that are executed by processor 106 to generate a visual representation 120 of software design 110, illustratively shown stored within memory 102. Software design 110 is based upon a massively parallel hierarchical design model that defines work from the most abstract level down to a level of code. Visual representation 120 is a visual representation of at least part of software design 110, and may represent a decomposition graph for example. The decomposition graph may include a global view showing all decomposition levels, processes and sub-graphs. FIG. 2 shows one exemplary hierarchical decomposition graph 200 that may represent visual representation 120.

Visual representation generator 108 generates embedded symbols 124 for each process 122 within visual representation 120.

Memory 102 also includes a completion calculator 130 that has machine readable instructions executable by processor 106 to generate completion information 132. Completion information 132 may be displayed on visual representation 120 by visual representation generator 108. Optionally, completion calculator 130 identifies one or more uncompleted processes 122 and may be user initiated or an automated process of system 100.

FIG. 2 shows one exemplary hierarchical decomposition graph 200 that represents software design 110 of FIG. 1.

Within hierarchical decomposition graph 200, dashed lines represent control flows C1-C11, solid lines represent data flows D1-D8, dashed circles represent control transforms CNT1-CNT3, solid circles represent process transforms, rectangles represent data stores 1-3 and squares represent terminators T1-T2. Each decomposition level contains one or more sub-graphs 202, one sub-graph for each decomposing process. Each sub-graph 202 may be considered a code snippet in the McCabe sense. A process may decompose into a sub-graph with a minimum of two processes. A process that decomposes into a single lower-level process is not a valid decomposition as no additional graph information is added.

Figure 3:
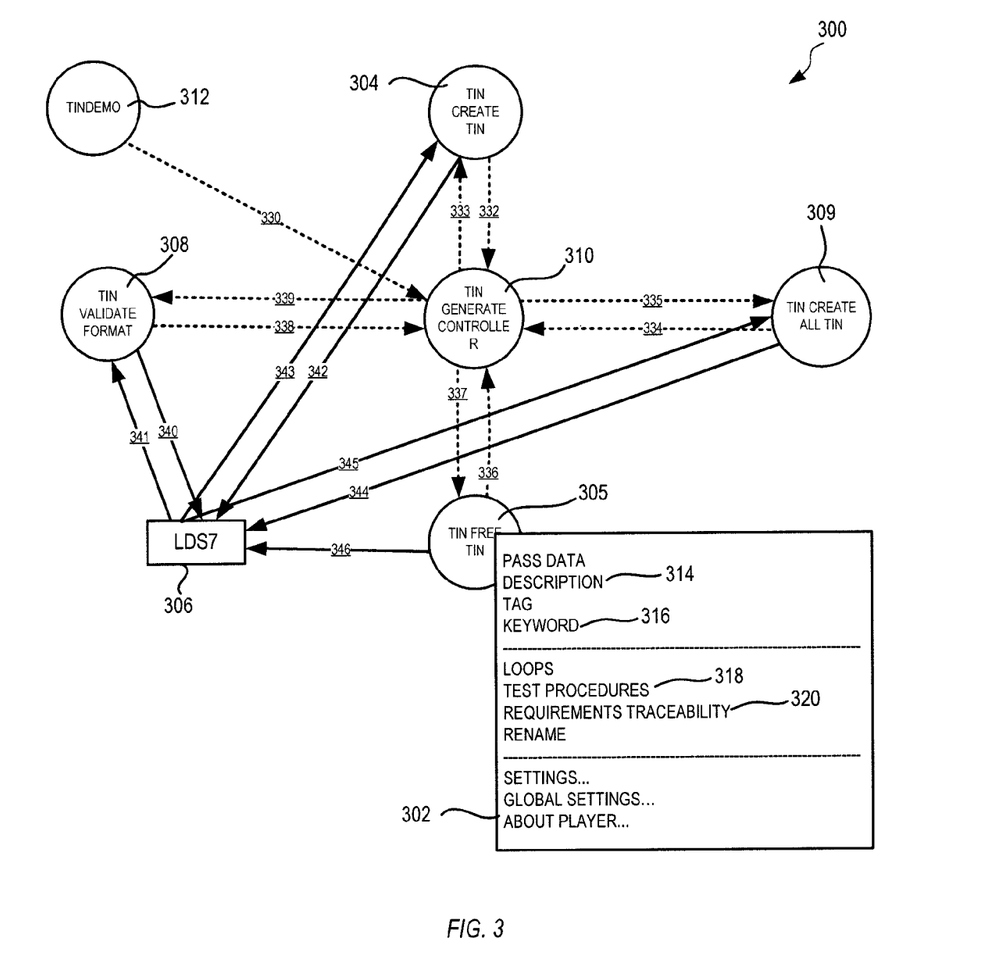
FIG. 3 shows a hierarchical design graph showing a graphical object options list, in one embodiment.

FIG. 3 shows a hierarchical design graph 300 with a graphical object options list 302. Within hierarchical design graph 300, graphical objects 304, 305, 306, 308, 309, 310, 312, are objects that represent either processes, in the case of objects 304, 305, 308, 309, 310 and 312, or a data store, in the case of data store 306. Specifically, objects 308, 309 represent processes that decompose into lower levels, objects 304, 305 represent processes that do not decompose into lower levels, object 310 represents a control kernel, and object 312 represents control from a higher decomposition level. Data store 306 is represented by a rectangle. Objects 304-312 are connected by connections 330-346. In an embodiment, objects 304, 305, 308, 309, 310, and 312 represent processes 122, FIG. 1.

In the embodiment of FIG. 3, objects 304, 305 and data store 306 are graphical objects that require information to transform from representations to design elements. Such information is added by selecting the graphical object, which causes graphical option list 302 to be displayed on hierarchical design graph 300. In the example of FIG. 3, graphical option list 302 is displayed for object Tin Free Tin 305 and includes a description item 314, a keywords item 316, a test procedures item 318, and a requirements traceability item 320. For object 305 to be considered complete, certain listed items should exist. For example, selections 314-320 are user selectable and require complete information for the associated process to perform its required function. Other items may exist within option list 302, for example, a Pass Data item, a Tag item, a Loops item, a Rename item, etc., but may not be required for object 305 to be considered complete.

Figure 4:
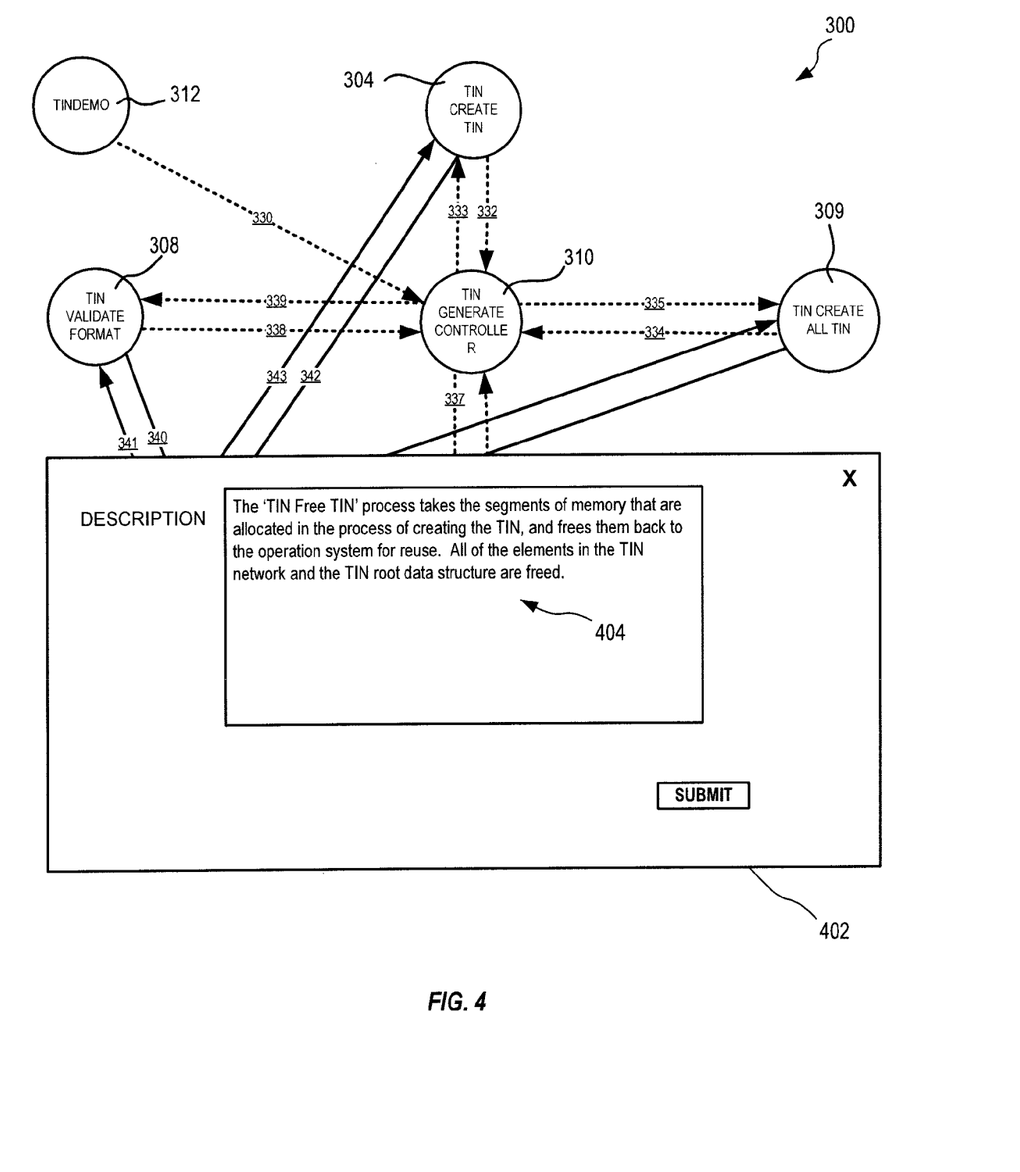
FIG. 4 depicts the hierarchical design graph of FIG. 3 after the description option is selected.

FIG. 4 depicts an exemplary pop-up window 402 displayed on the hierarchical design graph 300 of FIG. 3, such as when description item 314 is selected. A description 404 of an object may be entered within pop-up window 402 only after certain actions, for example, performing a two button selections process, such as right clicking an object to display option list 302, and then selecting description item 314. Thus, without the user performing these actions within graph 300, it is impossible for the user to learn whether description 404 has been entered. To provide visual indications of entered data (i.e., completeness of the design), embedded symbols 124 (see FIGS. 1 and 5) are displayed with hierarchical design graph 300 to provide a symbolic representation of the completeness of each object within software design 110. Embedded symbols 124 may indicate that the associated object requires additional information or that the associated object has sufficient information to be considered complete. A user (e.g., a developer, administrator, etc.) may select one of the embedded symbol 124 to open a pop-up window (e.g., pop-up window 402) and enter information. This single click access saves time and effort of developers.

Embedded Symbols

Figure 5:
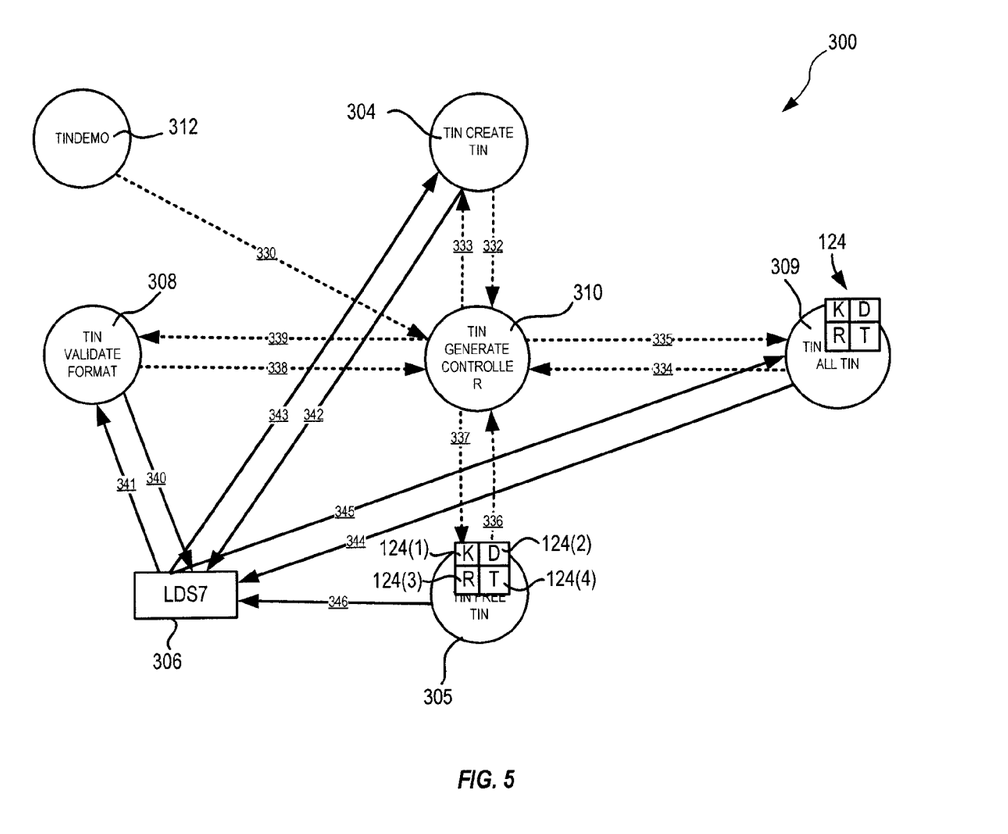
FIG. 5 depicts an exemplary hierarchical design graph including embedded symbols, in one embodiment.

FIG. 5 depicts hierarchical design graph 300 of FIG. 3 with embedded symbols 124 of FIG. 1. Objects 304-310 are either static (meaning they are not changeable by the user) or drag-and-drop (meaning they are created from a template defined elsewhere within software design 110 and positioned within hierarchical design graph 300—i.e., movable). Embedded symbols 124 indicate whether certain attributes of the associated object/element have been entered and which attributes still need to be defined. Embedded symbols 124 are not directly modifiable, but facilitate modification of certain attributes of the associated object/element.

There are four exemplary embedded symbols shown in FIG. 5. Not all the embedded symbols are labeled for clarity of illustration. Embedded symbol 124(1) "K" indicates that process associated with object 305 lacks a keyword list. Embedded symbol 124(2) "D" indicates that process associated with object 305 lacks a description. Embedded symbol 124(3) "R" indicates that process associated with object 305 lacks at least one requirement. Embedded symbol 124(4) "T" indicates that process associated with object 305 lacks a test procedure. More or fewer embedded symbols may be utilized without departing from the scope hereof.

As discussed above, embedded symbols 124(1)-(4) not only communicate to a user that additional information is required, but provide a single click process, that is, selecting with a single click one of embedded symbols. This single action causes to be displayed an input screen for entering the required data, for more details see FIG. 6.

In one embodiment, if an embedded symbol 124 is visible then the functionality represented by that symbol has not yet been accomplished for the associated element. For example, if a description (e.g., description 404) has been entered for object 305, then embedded symbol 124(2) is not displayed.

Figure 6:
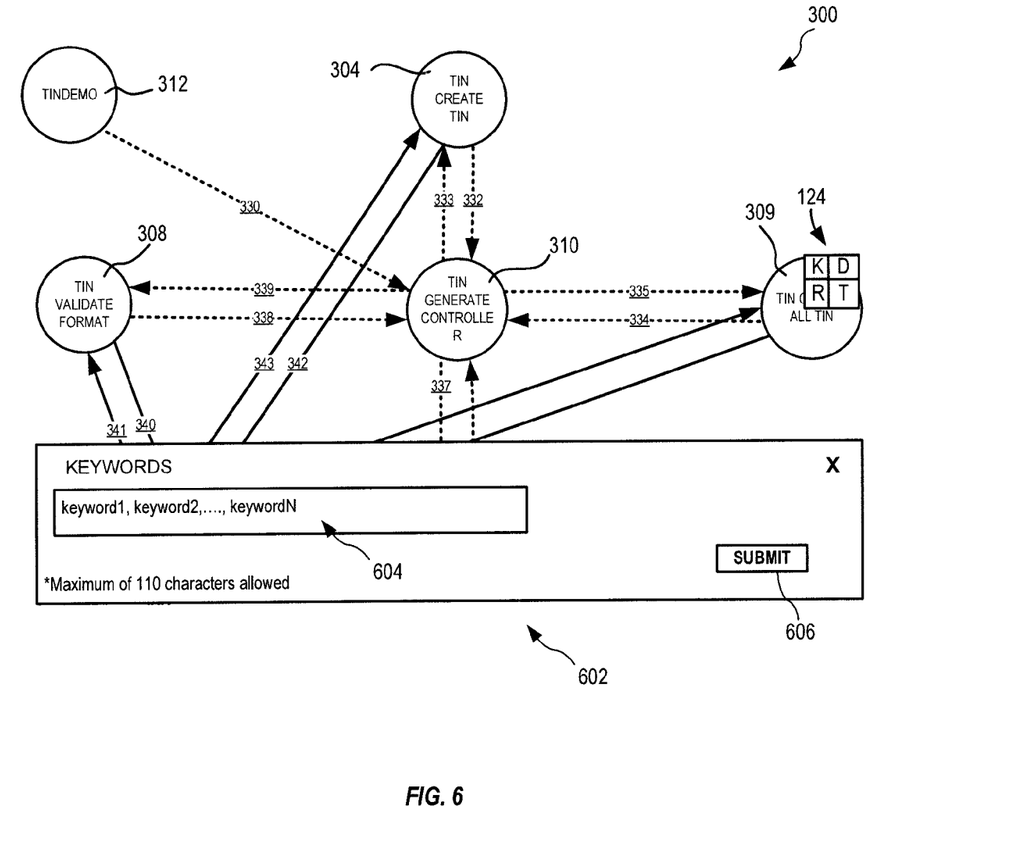
FIG. 6 depicts the hierarchical design graph of FIG. 5 wherein the "K" embedded symbol has been selected.

FIG. 6 depicts hierarchical design graph 300 of FIG. 3 and a keyword pop-up window 602 resulting from selection of embedded symbol 124(1) "K" of FIG. 5. That is, selection of embedded symbol 124(1) "K" causes system 100 to display keyword pop-up window 602. Similarly, system 100 displays other pop-ups when other embedded symbols 124 are selected by the user. A user/developer may then enter keywords 604 related to object 305 associated with embedded symbol 124(1) "K". Pressing a submit button 606 stores the user entered keywords 604 in association with object 305.

Figure 7:
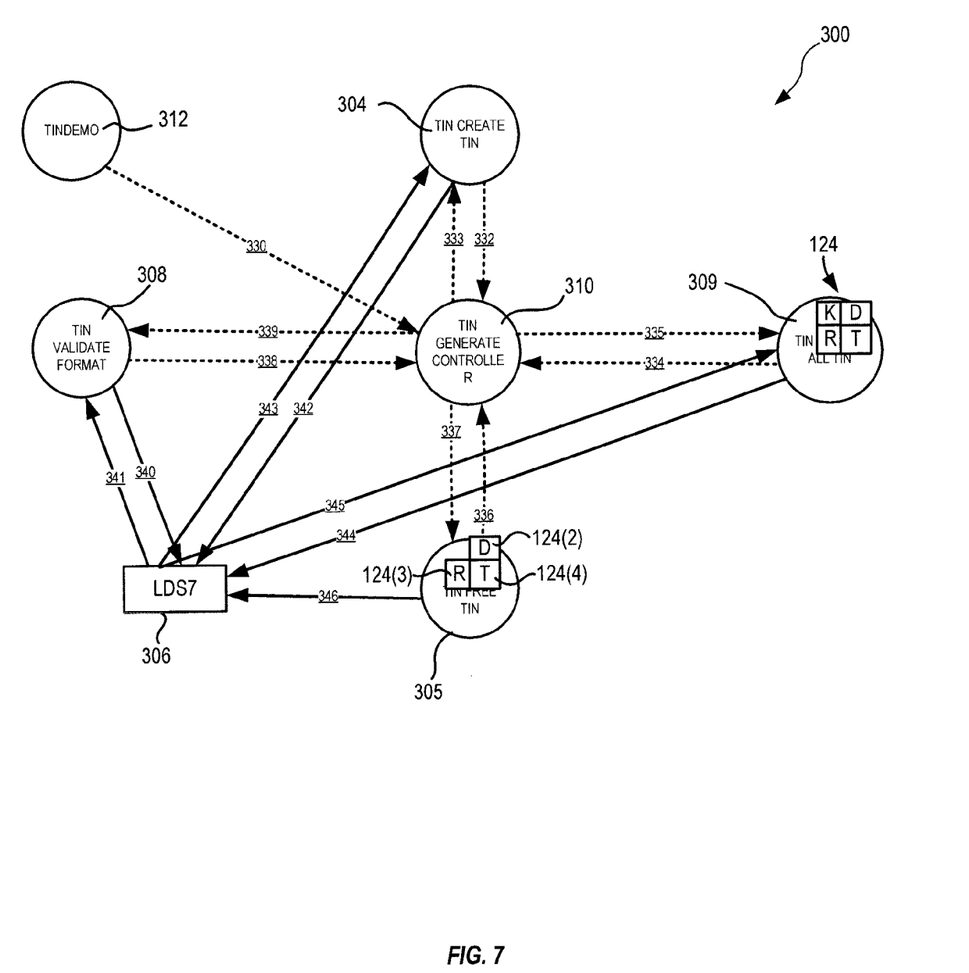
FIG. 7 depicts the hierarchical design graph of FIG. 5 after the keyword submit button of FIG. 6 has been selected.

FIG. 7 continues with the example of FIG. 6 and depicts hierarchical design graph 300 after keyword submit button 606 of FIG. 6 has been selected. Embedded symbol 124(1) is no longer displayed since the keyword required for object 305 has been entered. Accordingly, when all required attributes have been entered, no embedded symbols 124 are displayed for object 305.

Where a user desires to re-access, for example, the keyword list (i.e. keyword pop-up window 602), a user may right click on object 305 and select a keywords button. In one example, referring to FIG. 3, a user may select keywords button 316 to re-access keywords popup window 602.

In certain embodiments, embedded symbols 124 are only visible to privileged users. For example, privileges include: no privilege, read-only privilege, and edit privilege. If the user has no privileges then the Hierarchical Design Graph 300 is not accessible and, therefore, embedded symbols 124 cannot be displayed. Similarly, there is no reason to display the work-completion percentage (discussed in FIG. 8, below) to a worker with read-only privilege whom is not involved with the work or its management. Users with edit privileges are, for example, a manager or a developer that require access to embedded symbols 124.

Automatic Hierarchical Design Graph Completion from Embedded Symbols

Figure 8:
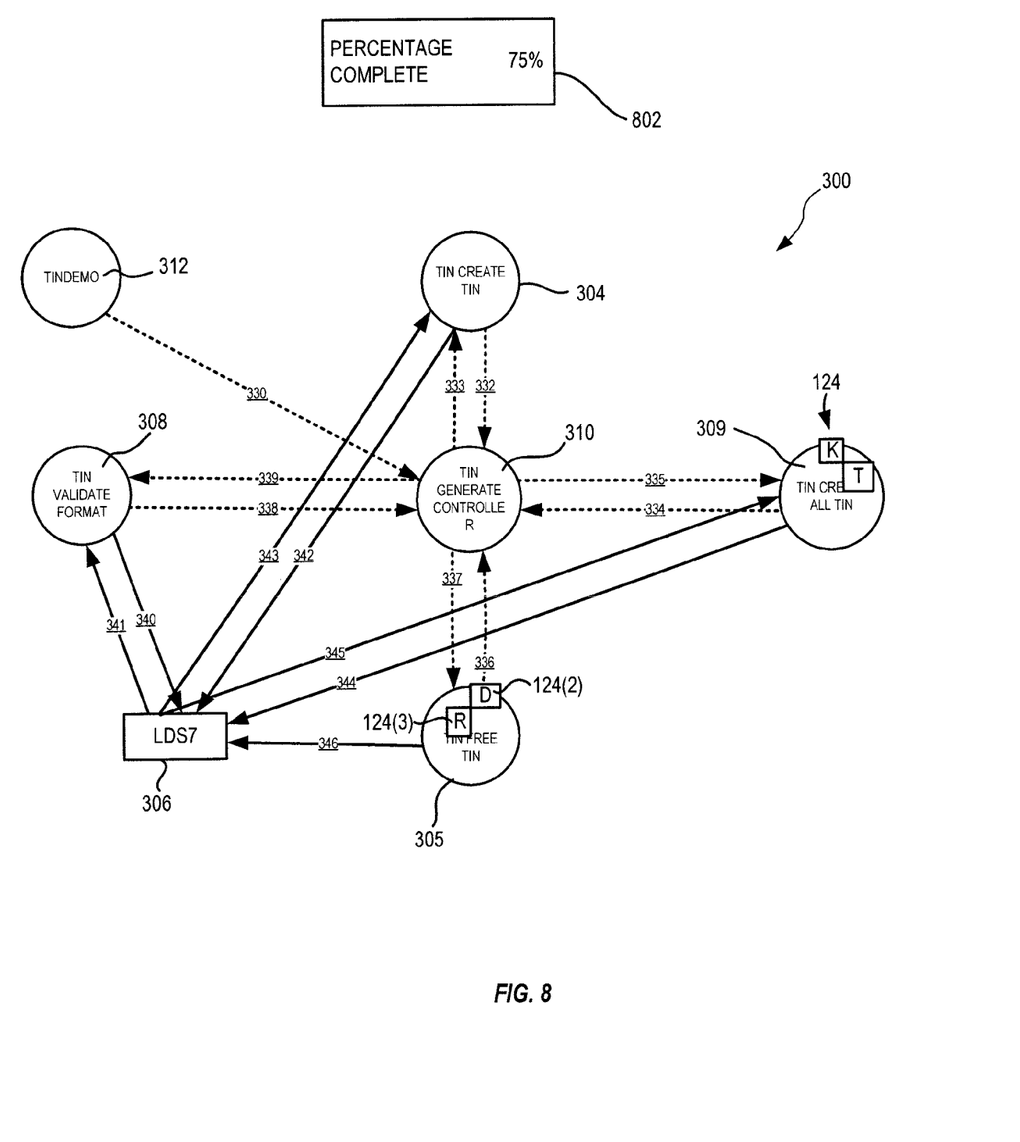
FIG. 8 depicts an exemplary hierarchical design graph including completion information, in one embodiment.

FIG. 8 depicts exemplary hierarchical design graph 300 with embedded symbols 124 and a percentage complete indicator 802. Since embedded symbols 124 indicate the per-graphical-object work left to be completed, system 100 may use this information to automatically calculate a graph-level-work percentage complete value for all displayed graphical objects of software design 110. For example, system 100 may determine the graph-level-work percentage complete value as follows:

Percentage of Graphical Object Work Completed    Equation 1

$$P = 1 - \frac{A}{M},$$

where 'A' equals the number of embedded symbols currently displayed and 'M' equals the total number of embedded symbols, displayed and not displayed.

In exemplary graph 300 of FIG. 8, graphical objects 304, 305, 308, and 309 each have four associated embedded symbols. However, for graphical objects 304 and 308, the embedded symbols are not displayed, indicating that the associated information has been entered. For each of graphical objects 305 and 309, two embedded symbols are displayed. Accordingly, by applying Equation 1 above, A equals four (i.e. two embedded symbols for each graphical object 305, 309) and M equals 16 (i.e. four embedded symbols possible for each graphical object 304, 305, 308, and 309). Therefore, percentage complete indicator 802 shows that elements shown in hierarchical design graph 300 are seventy-five percent complete. In the embodiment of FIG. 8 storage 306 and objects 310, 312 do not have associated embedded symbols, and therefore do not participate in the completeness calculation.

Figure 9:
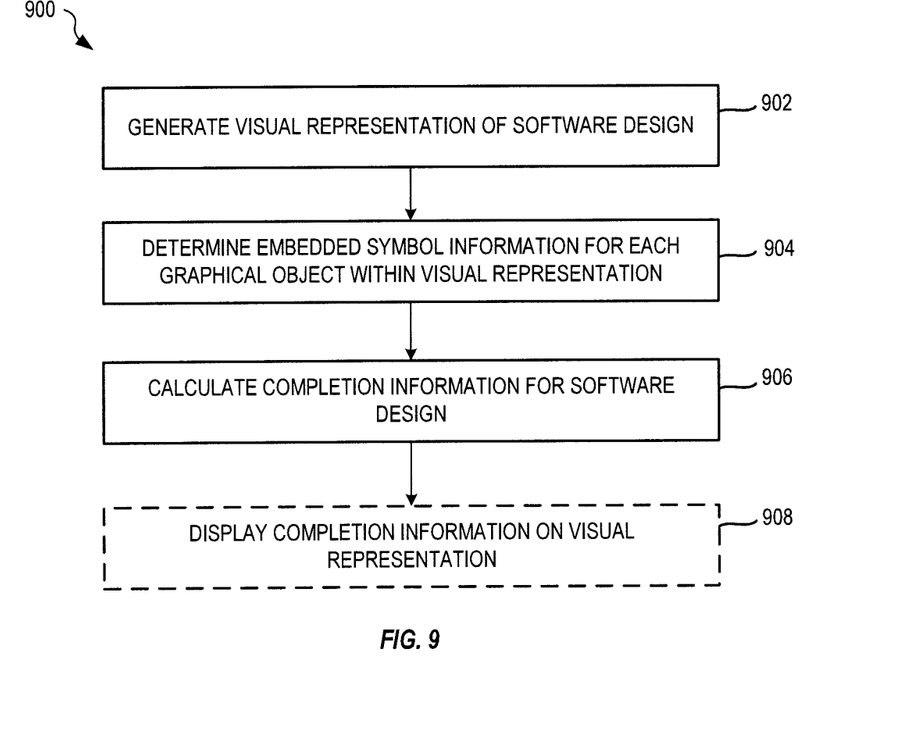
FIG. 9 depicts an exemplary method for determining completion information of a software design, in one embodiment.

FIG. 9 depicts an exemplary method 900 for determining completion information of a software design.

In step 902, a visual representation is generated for a software design. For example, visual representation generator 108 generates visual representation 120 having a plurality of graphical objects representing processes 122. Each graphical object may have at least one embedded symbol 124 associated therewith.

In step 904, method 900 determines embedded symbol information for each graphical object within the visual representation generated in step 902. For example, completion calculator 130 determines one or more of the total number of possible embedded symbols 124 for visual representation 120, and the total displayed embedded symbols 124 for each process 122 within visual representation 120.

In step 906, method 900 calculates the completion information for the software design. For example, completion calculator 130 calculates the percentage of embedded symbols 124 that are visible based upon the total number of embedded symbols, as determined in step 904. Completion calculator 130 then stores completion information 132 within memory of system 100.

In optional step 908, the completion information is displayed on the visual representation. For example, visual representation generator 108 displays completion information 132 concurrently with visual representation 120. Accordingly, a developer viewing display 152 may know the progress of software design 110.

Finding the Next Work Item Using Embedded Symbols

In certain embodiments, embedded symbols show what work needs to be completed on a graphical object. A developer (i.e. developer using computer 150 of FIG. 1) may search through visual representation to find graphical objects requiring work.

Figure 10:
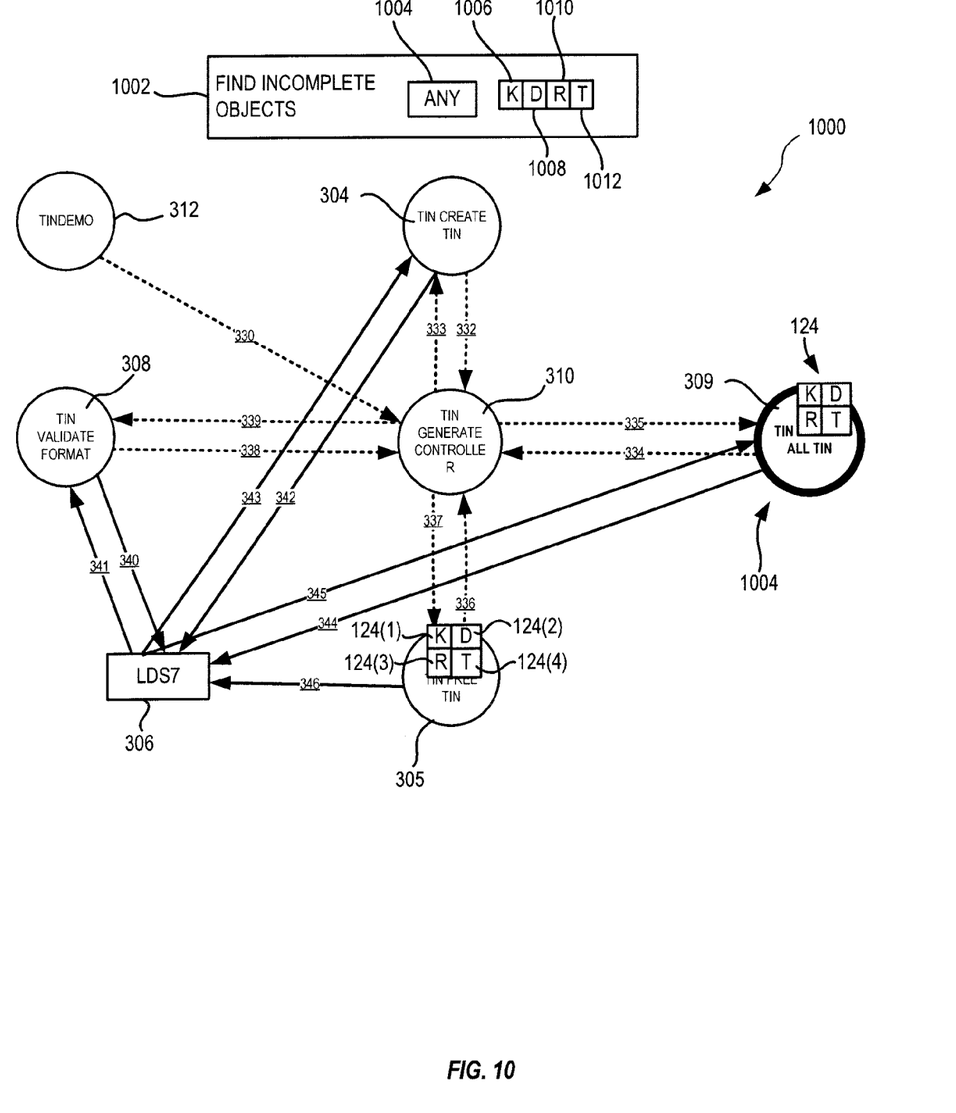
FIG. 10 depicts an exemplary hierarchical design graph including a find incomplete objects buttons, in one embodiment.

FIG. 10 depicts an exemplary hierarchical design graph 1000 similar to hierarchical design graph 300 of FIG. 5 with an additional incomplete object display 1002. Selecting one of the "Find Incomplete Objects" buttons 1004-1012 within incomplete object display 1002 causes system 100 to invoke a completion calculator 130 to find the next graphical object requiring work corresponding to the user selected button 1004-1012. Selecting the "ANY" button 1004 causes system 100 to find any object containing displayed embedded symbols. Selecting a button that corresponds to a particular embedded symbol (e.g., buttons 1006-1012) causes the system to find an instance of a graphical object containing the corresponding, displayed embedded symbol. The graphical object that is found with the selected embedded symbol may be indicated, for example, by highlight 1004. In one embodiment, visual representation generator 108 cooperates with completion calculator 130 to search the current graph, for example, in a clockwise fashion. If no highlighted graphical object is found, it will then search each level of the hierarchical graph until such an object is found. If a highlighted object is found on another level of the graph then display 152 is updated to display that level of the graph. If no highlighted object is found anywhere in the graph then an information statement is displayed, for example, indicating "No Work Available".

Embedded symbols 124 allow users to instantly learn what work is left to be done on an object-by-object basis. This directs the work and provides a simplified work-status review model. In addition, embedded symbols grant fast, single-selection access to the to-be-performed work. Work-completion percentages may be calculated directly from embedded symbols. Finally, the ability to view embedded symbols may be controlled via the privileges granted to the user.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for embedding symbols within a visual representation of a software design to indicate completeness, comprising:
   generating, using a digital processor, the visual representation of at least a portion of a hierarchical software design, the visual representation having a plurality of decomposition levels, the visual representation having a plurality of objects representing the decomposition levels, sub-graphs, processes, controls, and control flow indicators within the hierarchical software design, each decomposition level having a minimum of two processes, each process object connected to a control object by a control flow indicator;
   identifying, for each object within the visual representation of the software design, work to be completed;
   generating one or more embedded symbols representing one or both of (1) completed work and (2) work to be completed for each object within the software design;
   associating the one or more embedded symbol with its respective object; and wherein each control object represents a software routine containing a computer-language construct chosen from a group of computer language constructs consisting of: subroutine calls, looping statements, decision statements, and branching statements.

2. The method of claim 1, further comprising displaying one or more embedded symbols representing work to be completed on the visual representation in association with its respective object.

3. The method of claim 1, further comprising:
determining embedded symbol information for each object;
calculating completion information for the software design based upon the embedded symbol information.

4. The method of claim 3, wherein the embedded symbol information includes a total number of embedded symbols for the entire visual representation, and one or more of (1) a total number of displayed embedded symbols, and (2) a total number of non-displayed embedded symbols.

5. The method of claim 3, further comprising displaying one or more embedded symbols representing work to be completed on the visual representation in association with the one or more embedded symbol's respective object.

6. The method of claim 4, wherein the step of calculating completion information includes determining a percentage of work completed based upon the total number of embedded symbols representing work to be completed and the total number of embedded symbols representing completed work.

7. The method of claim 4, wherein the step of calculating completion information includes determining a percentage of work to be completed based upon the total number of embedded symbols representing work to be completed and the total number of embedded symbols representing completed work.

8. The method of claim 3, further comprising displaying the completion information concurrently with the visual representation.

9. The method of claim 3 further comprising:
receiving a find objects request defining one or more of the at least one embedded symbols to be found within the visual representation;
determining at least one object to be completed defining any of the at least two objects having a visible embedded symbol based upon the find objects request.

10. The method of claim 9 further comprising displaying a notification based upon the at least one object to be completed.

11. A system for embedding symbols within a visual representation of a software design to indicate completeness of the software design, comprising:
a memory, in communication with the processor, for storing a hierarchical software design having a plurality of decomposition levels;
a visual representation generator, stored within the memory as computer readable instructions that, when executed by the processor, is capable of performing the steps of:

generating and storing in memory a visual representation of the software design, design, the visual representation having a plurality of decomposition levels, the visual representation having a plurality of objects representing the decomposition levels, sub-graphs, processes, controls, and control flow indicators within the hierarchical software design, each decomposition level having a minimum of two processes, each process object connected to a control object by a control flow indicator, wherein the control object represents a software routine containing a computer-language construct chosen from a group of computer language constructs consisting of: subroutine calls, looping statements, decision statements, and branching statements; and generating and storing in memory at least one embedded symbol associated with at least one of the at least two objects;

a completion calculator, stored within the memory as computer readable instructions that, when executed by the processor, utilizes embedded symbol information to calculate completion information.

12. The system of claim 11, wherein the processor cooperates with the memory to display the visual representation of the software design on a display, the displayed visual representation of the software design including at least one embedded symbol representing work to be completed.

13. The system of claim 11, wherein the embedded symbol information includes a total number of embedded symbols for the entire visual representation, and one or more of (1) total number of displayed embedded symbols and (2) total number of non-displayed embedded symbols.

14. The system of claim 13, wherein the completion calculator further comprising computer readable instructions that, when executed by the processor, generate completion information.

15. The system of claim 14, wherein the completion information defining a percentage of work completed based upon the total number of embedded symbols and the total number of non-displayed embedded symbols.

16. The system of claim 14, wherein the completion information defining a percentage of work to be completed based upon the total number of embedded symbols and the total number of displayed embedded symbols.

17. The method of claim 1, wherein each process object representing a first software routine, and each control object representing a second software routine.

18. The method of claim 17, wherein the first software routine does not contain a computer-language constructs chosen from a group of computer language constructs consisting of: subroutine calls, looping statements, decision statements, and branching statements.

* * * * *